(12) United States Patent
Chen

(10) Patent No.: US 10,048,707 B2
(45) Date of Patent: Aug. 14, 2018

(54) CONSTANT-TEMPERATURE CONTROLLED CIRCUIT FOR AN ELECTRIC HEATING DEVICE

(71) Applicant: Dongguan City Sinoshine Technology Co., Ltd., Dongguan (CN)

(72) Inventor: Jihong Chen, Dongguan (CN)

(73) Assignee: Dongguan City Sinoshine Technology Co., Ltd., Dongguan (CN)

( * ) Notice: Subject to any disclaimer, the term of this patent is extended or adjusted under 35 U.S.C. 154(b) by 246 days.

(21) Appl. No.: 14/985,363

(22) Filed: Dec. 30, 2015

(65) Prior Publication Data
US 2016/0334815 A1    Nov. 17, 2016

(30) Foreign Application Priority Data

May 14, 2015    (CN) .................... 2015 2 0312604 U

(51) Int. Cl.
*H05B 1/02* (2006.01)
*G05D 23/24* (2006.01)

(52) U.S. Cl.
CPC .......... *G05D 23/24* (2013.01); *H05B 1/0272* (2013.01)

(58) Field of Classification Search
CPC ........ G05D 23/24; H05B 1/0272; H05B 3/12; H05B 3/56; H05B 3/34
USPC .......................... 219/212, 494, 505, 497, 518
See application file for complete search history.

(56) References Cited

U.S. PATENT DOCUMENTS

| | | | | |
|---|---|---|---|---|
| 5,770,836 A * | 6/1998 | Weiss | ................... | H05B 1/0272 219/212 |
| 6,840,955 B2 * | 1/2005 | Ein | ........................ | A61F 7/007 219/528 |
| 8,383,992 B2 * | 2/2013 | Wang | ................... | H05B 1/0252 210/721 |
| 8,698,045 B2 * | 4/2014 | Daniels | .................... | H05B 3/56 219/212 |
| 8,772,679 B2 * | 7/2014 | Novikov | ............... | H05B 1/0272 219/488 |
| 9,320,084 B2 * | 4/2016 | Weiss | ..................... | H05B 3/146 |
| 2015/0195869 A1 * | 7/2015 | Chang | .................. | H05B 1/0288 219/501 |

* cited by examiner

*Primary Examiner* — Mark Paschall
(74) *Attorney, Agent, or Firm* — Gokalp Bayramoglu

(57) ABSTRACT

This disclosure discloses a constant-temperature controlled circuit for an electric heating device, comprises an AC/DC switching circuit, a heating strip and a temperature controlled circuit; the heating strip comprises a heating line, a temperature sensing line and a NTC layer located between the heating line and the temperature sensing line; the temperature controlled circuit comprises a central processing unit, a voltage sampling circuit, a TRIAC circuit and a load detection circuit. Compared with existing technology, in the heating process, resistance of the NTC layer decreases as the temperature increases, since the heating strip and the voltage sampling circuit are connected in series, the output sample voltage of the voltage sampling circuit reflects the current temperature, and then the central processing unit outputs controls to switch the TRIAC circuit on or off according to the sample voltage, keeping the device at a constant temperature. Constant temperature control is realized.

8 Claims, 3 Drawing Sheets

CONSTANT-TEMPERATURE CONTROLLED CIRCUIT FOR AN ELECTRIC HEATING DEVICE

FIELD OF THE INVENTION

This invention relates to the field of electric heating devices, and more specifically, relates to a constant-temperature controlled circuit for an electric heating device.

BACKGROUND

Electric heating devices are widely used in people's daily lives, especially electric blankets, hot compress pads and so on. However, existing electric heating devices usually heats with power on and stops heating with power off. Therefore, when an electric heating device is used, the user needs to switch off the power manually when the electric heating device reaches a specific temperature. The electric heating device will continually heat up if the power is not switched off manually, eventually resulting in a spontaneous combustion. This is a safety loophole and at the same time, when powered off for a period, the electric heating device needs to be restarted by a user manually, which is very inconvenient and provides a poor user experience.

Therefore, it is very necessary to have a constant-temperature controlled circuit, which can automatically cutoff the power when the electric heating device reaches a predetermined temperature and can also automatically heat up when the temperature of the electric heating device comes down to another predetermined value, to overcome the above disadvantages.

SUMMARY OF THE INVENTION

This invention aims to provide a constant-temperature controlled circuit for an electric heating device. The constant-temperature controlled circuit can automatically power oft when the temperature reaches a preset value, and automatically heat up when the temperature reduces to a preset value, which implements a constant-temperature control of a heating device and improves safety and user experience.

This invention provides a constant-temperature controlled circuit for an electric heating device, which comprises:

an AC/DC switching circuit, which is used to switch an external AC (alternating current) into a +5V DC (direct current);

a heating strip which comprises a heating line, a temperature sensing line, and a NTC layer located between the heating line and the temperature sensing line, wherein the input end of the heating line is connected to the fire line of the external alternating current;

a temperature controlled circuit comprises a central processing unit, a Voltage sampling circuit, a TRIAC circuit and a load detection circuit. The +5V direct current provides working voltage for the central processing unit. The first end of the TRIAC circuit is connected to the output end of the heating line. The second end of the TRIAC circuit is connected to the load detection circuit. The Load detection circuit detects whether the load is connected and outputs the detected result to the central processing unit. The voltage sampling circuit is connected to the temperature sensing line and the sample voltage input end of the central processing unit, and outputs the sample voltage to the central processing unit. The control output end of the central processing unit is connected to the control end of the TRIAC circuit. The central processing unit outputs control signals to the control end in order to switch the TRIAC circuit on or off according to the sample voltage and the corresponding voltage grades of the selected temperature grades.

Compared with existing technology, this invention refers to a constant-temperature controlled circuit for electric heating devices, which comprises: an AC/DC switching circuit, a heating strip and a temperature controlled circuit. The temperature controlled circuit comprises a central processing unit, a voltage sampling circuit, a TRIAC circuit, and a load detection circuit. In the heating process, resistance of the NTC layer decreases as the temperature increases. Since the temperature sensing line of the heating strip and the voltage sampling circuit are connected in a series, the output sample voltage of the voltage sampling circuit can reflect the current temperature, and then the central processing unit outputs controls to switch the TRIAC circuit on or off according to the sample voltage, keeping the device at a constant temperature, namely, constant temperature control is realized.

Preferably, the TRIAC circuit comprises triac Q1 and triac Q2. The first end of triac Q1 is connected to the output end of the heating line. The second end of triac Q1 is connected to the first end of triac Q2. The second end of triac Q2 is connected to the load detection circuit. The control end of triac Q1 and triac Q2 are separately connected to two control output ends of the central processing unit.

Preferably, the load detection circuit comprises resistors R17, R18, R40 and a capacitor C7. Resistor R17, resistor R18 and capacitor C7 are all connected in parallel. The first end of the parallel connection is connected to the second end of triac Q2 and the first end of resistor R40. The second end of the parallel connection is grounded. The second end of resistor R40 is connected to the central processing unit to output the detected result to the central processing unit.

Preferable, the voltage sampling circuit comprises resistors R21, R22, R25 and diodes D6 and D7. The anode of diode D6 is connected to the first end of the temperature sensing line. The cathode of diode D6 is connected to the first end of resistor R21. The second end of resistor R21 is connected to the first end of resistor R25, the cathode of diode D7 and the first end of resistor R22. The anode of diode D7 and the second end of resistor R25 are grounded. The second end of resistor R22 is connected to the central processing unit to output voltage samples to the central processing unit.

Preferably, the constant temperature controlled circuit for an electric heating device further comprises:

a short-circuit protection circuit. The first end of the short-circuit protection circuit is connected to the temperature sensing line of the heating strip, the second end of the short-circuit protection circuit is connected to the null line of the external alternating current. When the current temperature is too high, the heating line and the temperature sensing line of the heating strip will short out, then current will be overlarge, and the short-circuit protection circuit will disconnect from the external alternating current to stop heating due to the overlarge current in the short-circuit protection circuit.

Preferably, the short-circuit protection circuit comprises fuse F2, and resistors R23 and R24. The first ends of resistors R23 and R24 are connected to the temperature sensing line, the second ends of resistors R23 and R24 are grounded. The first end of fuse F2 is connected with the null line of the external alternating current. The second end of fuse F2 is connected with the AC/DC switching circuit. Resistors R23 and R24 are physically contacted with use F2.

Preferably, the constant temperature controlled circuit for an electric heating device further comprises:

a zero triggering circuit. The zero triggering circuit is connected to the fire line of the external alternating current and the zero signal input end of the central processing unit, which is used to detect the zero signal of the external alternating current and output the zero signal to the central processing unit. When the corresponding current temperature of the sample voltage is lower than the selected temperature grade and the central processing unit receives the zero signal, the central processing unit outputs the control signals to the control end to switch on the TRIAC circuit.

Preferably, the constant temperature controlled circuit for an electric heating device further comprises:

an AC detection circuit, which is used to detect the voltage of external alternating current (AC) and output the detected result to the central processing unit, the central processing unit determines whether the current temperature is caused by the instability of the external alternating current according to the detected result;

a seven-segment LED display circuit, which is connected to the central processing unit and used to display the selected temperature grade; and a button control circuit, which is connected to the central processing unit and used for startup and shutdown, or setting up the selected temperature grade.

Preferably, the AC/DC switching circuit comprises a fuse F1, a piezoresistor RV1, a plurality of resistors R5, R6, R7, a plurality of capacitors C1, C2, C3, C4, C5, a plurality of diodes D2, D3, and a voltage stabilizing diode D4. The first end of fuse F1 is connected to the fire line of the external alternating current, the second end of fuse F1 is connected to the first ends of piezoresistor RV1, capacitor C1, capacitor C2 and resistor R5. The second ends of piezoresistor RV1 and capacitor C1 are connected to the null line of the external alternating current. The second end of resistor R5 is connected to the first end of resistor R6. The second ends of resistor R6 and capacitor C2 are both connected to the first end of resistor R7. The second end of resistor R7 is connected to the cathode of diode D2 and the anode of diode D3. The cathode of diode D3 is connected to the cathode of voltage stabilizing diode D4, and the first ends of capacitor C3, capacitor C4 and capacitor C5. The anode of diode D2, the anode of voltage stabilizing diode D4, and the second ends of capacitor C3, capacitor C4, and capacitor C5 are all connected to the null line of the external alternating current.

Preferably, the AC detecting circuit comprises resistors R1, R2, R3, R4 and a diode D1. The first end of resistor R1 is connected to the second end of fuse F1, the second end of resistor R1 is connected to the anode of diode D1 and the first end of resistor R2. The cathode of diode D1 is connected to the first ends of resistors R3 and R4. The second ends of resistors R2 and R3 are connected to the null line of the external alternating current. The second end of resistor R4 is connected to the central processing unit to output the detected result to the central processing unit.

The descriptions and drawings below will clarify this invention in a much clearer way. These drawings are used to describe the embodiments al this invention.

DETAIL DESCRIPTION OF THE INVENTION

Figure 1:
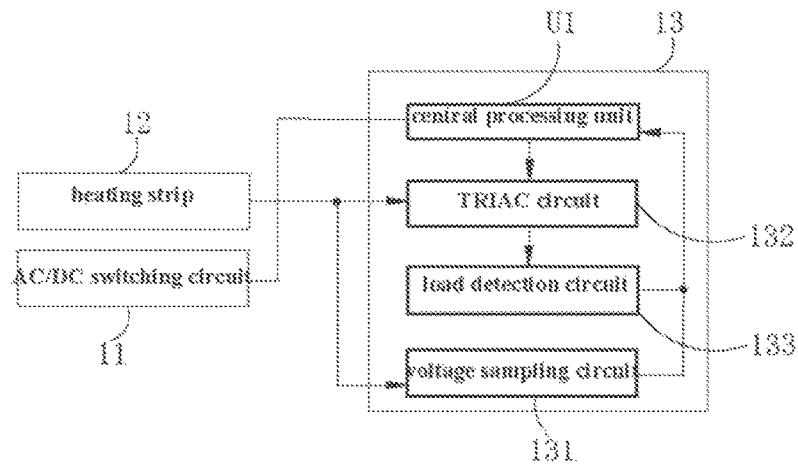
FIG. 1 shows a structural diagram of the first embodiment of a constant-temperature controlled circuit for an electric heating device within this invention.

Different embodiments will be described below according to the drawings. Similar character references in the drawings mean similar elements.

According to FIG. 1, this invention refers to a constant-temperature controlled circuit for heating device 100, which comprises: AC/DC switching circuit 11, heating strip 12, and temperature controlled circuit 13. AC/DC switching circuit 11 is used to switch an external alternating current AC into a +5V DC. Heating strip 12 comprises a heating line, a temperature sensing line, and a NTC layer located between the heating line and temperature sensing line. The input end of the heating line is connected to fire line AC_L of the external alternating current (AC). Temperature control circuit 13 comprises central processing unit U1, Voltage sampling circuit 131, TRIAC circuit 132 and load detection circuit 133. The first end of TRIAC circuit 132 is connected to the output end of the heating line. The second end of TRIAC circuit 132 is connected to load detection circuit 133. Load detection circuit 133 detects whether the load is connected in and outputs the detected result to central processing unit U1. Voltage sampling circuit 131 is connected to the temperature sensing line and the sample voltage input end of central processing unit U1 in order to output the sample voltage to central processing unit U1. The control output end of the central processing unit is connected to the control end of TRIAC circuit 132. Central processing unit U1 outputs control signals to the control end to switch TRIAC circuit 132 on or off according to the sample voltage and the correspond voltage grades of the selected, temperature grades.

Figure 2:
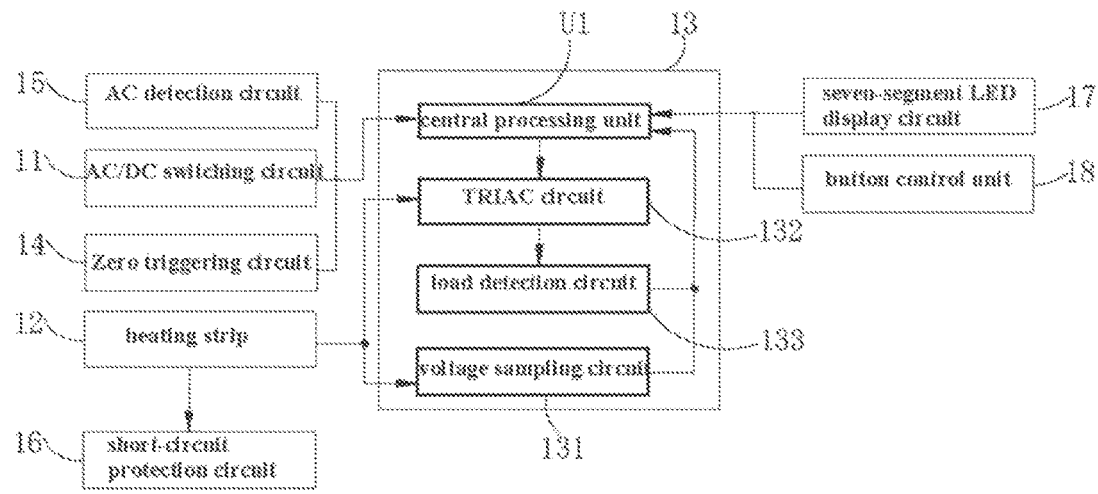
FIG. 2 shows a structural diagram of the second embodiment of a constant-temperature controlled circuit for a heating device within this invention.

According to FIG. 2, a constant-temperature controlled circuit for heating device 100 further comprises zero triggering circuit 14, AC detection circuit 15, short-circuit protecting circuit 16, seven-segment LED display circuit 17, and button control unit 18. Zero triggering circuit 14 is connected to tire line AC_L of the external alternating current AC and the zero signal input end (pin 17) of central processing unit U1. When the corresponding temperature of the sample voltage is lower than the selected temperature grade and central processing unit U1 receives the zero signal, central processing unit U1 outputs a control signal to the control end to switch TRIAC circuit 132 on. AC detection circuit 15 is used to detect the voltage of the external alternating current AC and output the detected result to central processing unit U1. Central processing unit U1 determines whether the current temperature is caused by the instability of external alternating current AC according to the detected results. If central processing unit U1 confirms the instability of external alternating current AC, then central processing unit U1 will compensate accordingly to reach a constant temperature. The first end of short-circuit protection circuit 16 is connected to the temperature sensing line of heating strip 12, the second end of short-circuit protection circuit 16 is connected to null line AC_N of external alternating current AC. When the current temperature is too high, the heating line and the temperature sensing line of the heater strip will short out, and the resistance of heating strip 12 would decrease significantly, then the current in short-circuit protection circuit 16 will be overlarge, and short-circuit protection circuit 16 will disconnect from external alternating current AC to stop heating due to the overlarge current in the short-circuit protection circuit. Seven-segment LED display circuit 17 is used to display the selected temperature grade. Button control circuit 18 is used for device startup, shutdown, and to select temperature grades.

Figure 3:
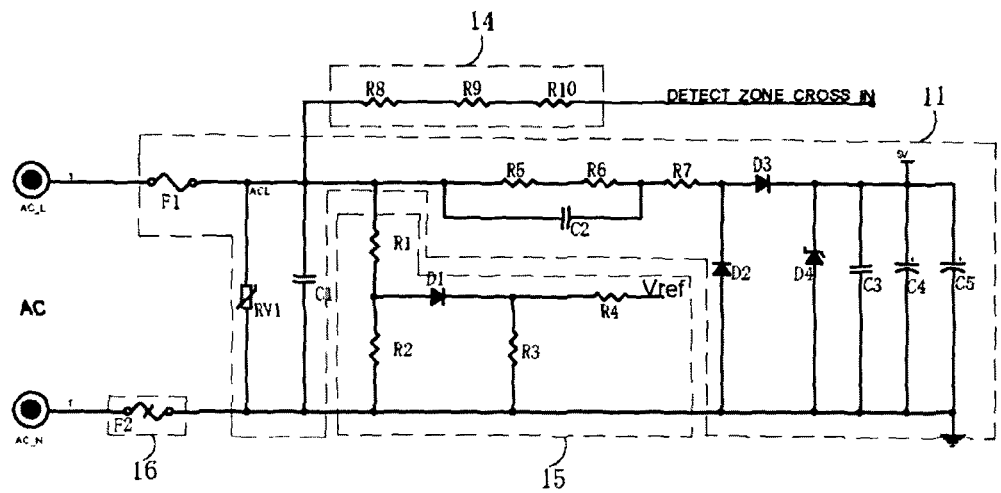
FIG. 3 shows the circuit diagrams of the AC/DC switching circuit, zero triggering circuit, AC detection circuit and short-circuit protection circuit in FIG. 2.

According to FIG. 3, external alternating current AC has a voltage of 120V and a frequency of 60 HZ. In this embodiment, AC/DC switching circuit 11 is a RC-decrease circuit. Specifically, AC/DC switching circuit 11 comprises fuse F1, piezoresistor RV1, a plurality of resistors R5, R6, R7, a plurality of capacitors C1, C2, C3, C4, C5, a plurality of diodes D2, D3, and voltage stabilizing diode D4. The first end of fuse F1 is connected to fire line AC_L, of external alternating current AC, the second end of fuse F1 is connected to the first ends of piezoresistor RV1, capacitor C1, capacitor C2 and resistor R5. The second ends of piezoresistor RV1 and capacitor C1 are connected to null line AC_N of external alternating current AC. The second end of resistor R5 is connected to the first end of resistor R6. The second ends of resistor R6 and capacitor C2 are both connected to the first end of resistor R7. The second end of resistor R7 is connected to the cathode of diode D2 and the anode of diode D3. The cathode of diode D3 is connected to the cathode of voltage stabilizing diode D4, the first ends of capacitors C3, C4 and C5. The anode of diode D2, the anode of voltage stabilizing diode D4, and the second ends of capacitors C3, C4, and C5 are all connected to null line AC_N of external alternating current AC. Fuse F1 and piezoresistor RV1 are used to protect the circuit. Resistors R5, R6 and capacitor C2 are used for RC voltage decreasing. Diodes D2 and D3 constitute a rectifying circuit. Voltage stabilizing diode D4 is used for voltage stabilization. Capacitors C3, C4 and C5 are used for filtering. External alternating current AC is turned into a +5V direct current after being processed by AC/DC switching circuit 11.

In FIG. 3, zero triggering circuit 14 comprises resistors R8, R9, and R10, which are connected in series. The first end of the series is connected to the second end of fuse F1. The second end of the series (DETECT ZONE CROSS IN) is connected to the zero signal input end (pin 17) of central processing unit U1 to output a zero signal to central processing unit U1. To clarify, in other embodiments, zero triggering circuit 14 can merely consist of one resistor as long as the resistance of the resistor is appropriate. AC detection circuit 15 comprises a plurality of resistors R1, R2, R3, R4 and a diode D1. The first end of resistor R1 is connected to the second end of fuse F1, the second end of resistor R1 is connected to the anode of diode D1 and the first end of resistor R2. The cathode of diode D1 is connected to the first ends of resistor R3 and R4. The second ends of resistor R2 and resistor R3 are connected to null line AC_N of external alternating current AC. The second end of resistor R4 is connected to Pin 18 of central processing unit U1. The voltage (Vref) detected by Pin 18 of central processing unit U1 is considered as the detected result, which determines whether the external alternating current AC is normal. When the current temperature is too high, the detected result can determine whether the high temperature is caused by the heating of heater strip 12 or instability of the external alternating current AC (For example, rise to 140 v instantly).

Figure 4:
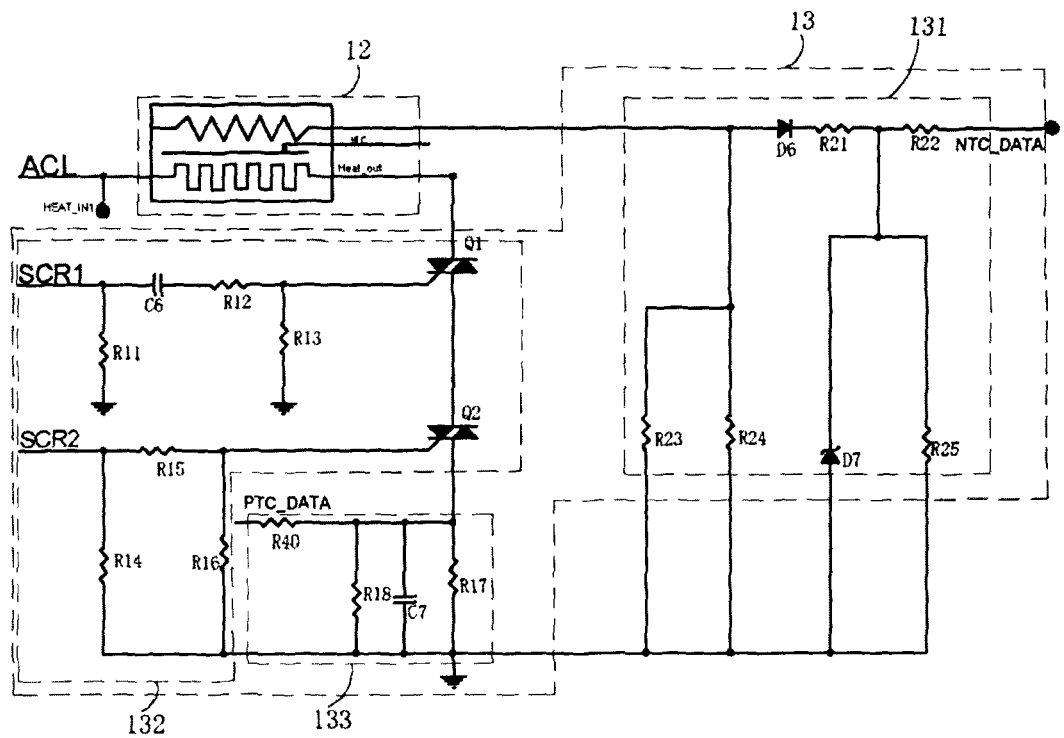
FIG. 4 shows the circuit diagrams of the temperature controlled circuit and short-circuit protection circuit in FIG. 2.

According to FIG. 4, TRIAC circuit 132 comprises triac Q1 and triac Q2, a plurality of resistors R11, R12, R13, R14, R15 and R16, and capacitor C6. The first end of triac Q1 is connected to the output end of the heating line. The second end of triac Q1 is connected to the first end of triac Q2. The second end of triac Q2 is connected to load detection circuit 133. The control ends of triac Q1 and triac Q2 are separately connected to two control output ends (pin 2 and pin 3) of central processing unit U1. Specifically, the control end of triac Q1 is connected to the first ends of resistors R12 and R13. The second end of resistor R12 is connected to the first end of capacitor C6. The second end of capacitor C6 is connected to the first end of resistor R11 and one of the control ends of central processing unit U1 (Pin 2, which is used to output control signal SCR1). The second ends of resistors R13 and R11 are both grounded. The control end of triac Q7 is connected to the first ends of resistors R15 and R16. The second end of R15 is connected to the first end of R14 and another one of the control output ends of central processing unit U1 (Pin 3, which is used to output control signal SCR2). The second ends of R14 and R16 are grounded. Triac Q1 is pulse driven, triac Q2 is high level driven. Load detection circuit 133 comprises resistors R17, R18, R40 and capacitor C7. Resistors R17, R18 and capacitor C7 are all connected in parallel. The first end of the parallel connection is connected to the second end of triac Q2 and the first end of R40. The second end of the parallel connection is grounded. The second end of resistor R40 is connected with Pin 7 of central processing unit U1. The data detected by Pin 7 of central processing unit U1 is PTC DATA, which reflects whether or not the load is connected into the circuit. When the load is connected into the circuit, the level of PCT DATA is high (about 0.4V). When the load is not connected into the circuit, the level of PCT DATA is almost zero. Voltage sampling circuit 131 comprises resistors R21, R22, R23, R24 and R25 and diodes D6 and D7. The anode of diode D6 is connected to the first ends of the temperature sensing line and resistors R23 and R24. The second ends of resistors R23 and R24 are grounded. The cathode of diode D6 is connected to the first end of resistor R21. The second end of resistor R21 is connected to the first end of resistor R25, the cathode of diode D7 and the first end of resistor R22. The anode of diode D7 and the second end of resistor R25 are grounded. The second end of resistor R22 is connected to central processing unit U1 to output voltage samples (corresponding to NTC DATA) to central processing unit U1 Central processing unit U1 controls the temperature according to the sample voltage received from resistor R22.

The resistance of the NTC layer located between the heating line and the temperature sensing line decreases as the temperature rises. As the heating temperature rises during the process of constant temperature control, the resistance of the NTC layer decreases, the current through resistor R25 increases, the voltage of resistors R23 and R24 increases, and then the sample voltage received by central processing unit U1 increases. Central processing unit U1 compares the sample voltage with the corresponding voltage grade of the selected temperature grade (for example, when the selected temperature grade is 40° C., the corresponding voltage grade is 0.6V). When the sample voltage is higher than the corresponding voltage grade of the selected temperature, central processing unit U1 outputs control signals SCR1 and SCR2 to TRIAC circuit 132 to cut off TRIAC circuit 132 and to stop heater strip 12 from heating. After the heating is terminated, the resistance of the NTC layer increases gradually. At the same time, both the current and voltage of resistors R23 and R24 decrease, and then the sample voltage received by central processing unit U1 decreases as well. When the sample voltage is lower than the corresponding voltage grade of the selected temperature grade, central processing unit U1 outputs control signals SCR1 and SCR2 to TRIAC circuit 132 to switch on TRIAC circuit 132, and allow heating strip 12 to start heating. Central processing unit U1 controls whether or not TRIAC circuit 132 should be on or off according to the sample voltage to remain heating strip 12 (or heating device) at a constant temperature.

According to FIG. 4, short-circuit protection circuit 16 comprises fuse F2, and resistors R23 and R24 (resistor R23 and resistor R24 is used to receive sample voltage and high temperature protection). The first ends of resistors R23 and R24 are connected to the temperature sensing line of heating strip 12, while the second ends are both grounded. The first end of fuse F2 is connected to null line AC_N of external alternating current AC. The second end of fuse F2 is connected to AC/DC switching circuit 11. Resistors R23 and R24 are physically contacted with fuse F2. That is to say, in the real circuit layout, resistor R23 and resistor R24 are physically contacted with fuse F2. When the temperature is too high, the NTC layer will fuse and short out the heating line and the temperature sensing line, then resistors R23 and R24 will heat up and burn out fuse F2. As a result, the overheating protection is realized, since external alternating current AC is cut off.

Figure 5:
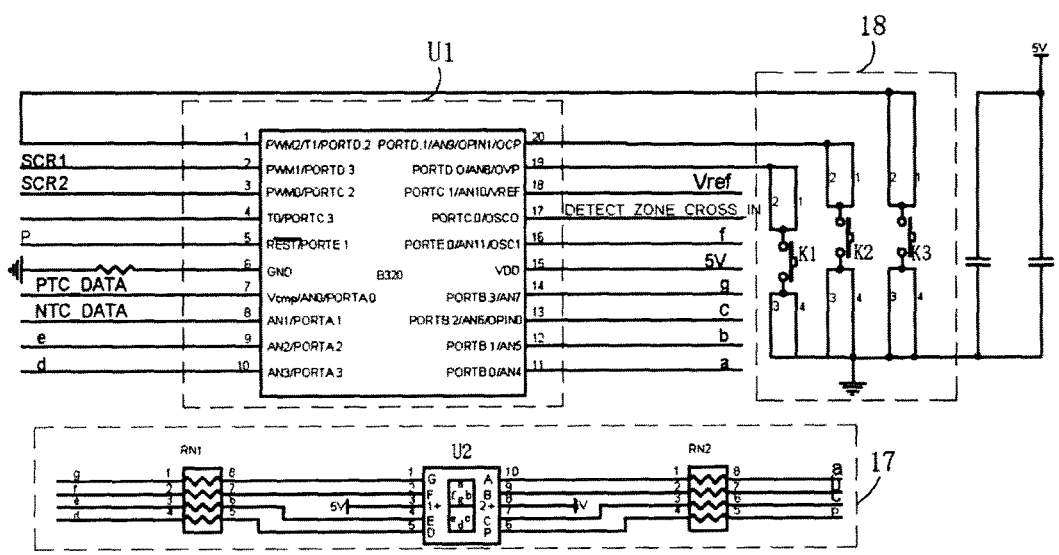
FIG. 5 shows the circuit diagrams of the central processing unit, seven-segment LED display circuit, and button control circuit in FIG. 2.

According to FIG. 5, seven-segment LED display circuit 17 comprises seven-segment LED digital nixie tube U2, resistor networks RN1 and RN2. Resistor networks RN1 and RN2 both comprise 4 resistors. Pins A, B, C, D, F, F, G of Seven-segment LED digital tube U2 are connected to central processing unit U1 through resistors of resistor network RN1 and RN2. The common pin of seven-segment LED digital tube U2 is connected to a +5V direct current. Button control circuit 18 comprises a temperature grade selecting button K1, a power on/off button K2 and a time setting button K3. The temperature grade selecting button K1 is used to select temperature grades, the number of temperature grades is set according to the requirement, for example, four temperature grades. After startup, the temperature grade will switch in turn each time the temperature grade selecting button K1 is pressed. Power on/off button K2 is used for startup and shutdown the device. Time setting button K3 is used to set timing time.

Compared with existing technology, during the heating process, the resistance of the NTC layer decreases while the temperature increases. The temperature sensing line and voltage sampling circuit 131 are connected in series, the sample voltage output by voltage sampling circuit 131 can reflect the current temperature. Central processing unit U1 outputs control signals to the control end to switch TRIAC circuit 132 on or off according to the sample voltage, which remains the device at a constant temperature, namely, constant temperature control is realized.

The above embodiments are the descriptions of this invention. This invention should cover all equivalent modifications and combinations of these embodiments, and is not limited to these embodiments.

The invention claimed is:

1. A constant temperature controlled circuit for an electric heating device, comprising:

an AC/DC switching circuit, which is used to switch an external alternating current into a +5V direct current;
a heating strip, which further comprises a heating line, a temperature sensing line, a NTC layer located between the heating line and the temperature sensing line, wherein an input end of the heating line is connected with a fire line of the external alternating current;
a temperature controlled circuit which further comprises a central processing unit, a voltage sampling circuit, a TRIAC circuit and a load detection circuit;
an AC detection circuit, which is used to detect the voltage of the external alternating current and output a detected result to the central processing unit, the central processing unit determines whether the temperature is caused by the instability of the external alternating current according to the detected result;
a seven-segment LED display circuit, which is connected to the central processing unit and used to display the selected temperature grades; and
a button control circuit which is connected to the central processing unit, wherein the button control circuit is used for startup, shutdown, or setting up the selected temperature grades;
wherein the +5V direct current provides a working voltage for the central processing unit, a first end of the TRIAC circuit is connected to an output end of the heating line, a second end of the TRIAC circuit is connected to the load detection circuit, the load detection circuit detects whether a load is connected and outputs a detected result to the central processing unit, the voltage sampling circuit is connected to the temperature sensing line and a sample voltage input end of the central processing unit to output a sample voltage to the central processing unit, a control output end of the central processing unit is connected to a control end of the TRIAC circuit, the central processing unit outputs a control signal to the control end to switch the TRIAC circuit on or off according to the sample voltage and a corresponding voltage grade of a temperature grade; and the AC/DC switching circuit comprises a fuse (F1), a piezoresistor (RV1), a plurality of resistors (R5, R6 and R7), a plurality of capacitors (C1, C2, C3, C4 and C5), a plurality of diodes (D2, D3), and a voltage stabilizing diode (D4); and
wherein a first end of fuse (F1) is connected to the fire line of the external alternating current, a second end of fuse (F1) is connected to first ends of the piezoresistor (RV1), capacitor (C1), capacitor (C2) and resistor (R5), second ends of piezoresistor (RV1) and capacitor (C1) is connected to the null line of external alternating current, a second end of resistor (R5) is connected to a first end of resistor (R6), a second end of resistor (R6) and a second end of capacitor (C2) are together connected to a first end of resistor (R7), a second end of resistor (R7) is connected to a cathode of the diode (D2) and an anode of the diode (D3), a cathode of the diode (D3) is connected to a cathode of the voltage stabilizing diode (D4), first ends of the capacitors (C3, C4 and C5), an anode of the diode (D2), an anode of the voltage stabilizing diode (D4), and second ends of the capacitor (C3), capacitor (C4), and capacitor (C5) are connected to the null line of the external alternating current.

2. The constant temperature controlled circuit for an electric heating device of claim 1, wherein, the TRIAC circuit comprises a triac (Q1) and a second triac (Q2), a first end of the triac (Q1) is connected to the output end of the heating line, a second end of the triac (Q1) is connected to the first end of the triac (Q2), a second end of the triac (Q2) is connected to the load detection circuit, control ends of the triac (Q1) and the triac (Q2) are separately connected to two control output ends of the central processing unit.

3. The constant temperature controlled circuit for an electric heating device of claim 2, wherein, the load detection circuit comprises a plurality of resistors (R17, R18 and R40) and a capacitor (C7), the resistor (R17), the resistor (R18) and the capacitor (C7) are together connected in parallel, a first end of the parallel connection is connected with a second end of the triac (Q2) and a first end of the resistor (R40), a second end of the parallel connection is grounded, a second end of the resistor (R40) is connected to the central processing unit to output a detected result to the central processing unit.

4. The constant temperature controlled circuit for an electric heating device of claim 1, wherein, the voltage sampling circuit comprises a plurality of resistors (R21, R22 and R25) and a plurality of diodes (D6 and D7), an anode of the diode (D6) is connected to a first end of the temperature sensing line, a cathode of diode (D6) is connected to a first end of the resistor (R21), a second end of the resistor (R21) is connected to a first end of the resistor (R25), a second end of the resistor (R21) is connected to a first end of the resistor (R25), a cathode of the diode (D7) and a first end of the resistor (R22), an anode of diode (D7) and a second end of resistor (R25) are grounded, a second end of the resistor (R22) is connected to the central processing unit to output the voltage sample to the central processing unit.

5. The constant temperature controlled circuit for an electric heating device of claim 1, further comprising a short-circuit protection circuit, wherein, a first end of the short-circuit protection circuit is connected with the temperature sensing line, a second end of the short-circuit protection circuit is connected with a null line of the external alternating current;
wherein when the current temperature is too high, the heating line and the temperature sensing line of the heating strip will short out, the current in the short-circuit protection will be overlarge, and the short-circuit protection circuit will disconnect from the external alternating current to stop heating due to the overlarge current in the short-circuit protection circuit.

6. The constant temperature controlled circuit for an electric heating device of claim 5, wherein, the short-circuit protection circuit comprises a fuse (F2), a resistor (R23) and a resistor (R24), first ends of the resistor (R23) and the resistor (R24) are connected to the temperature sensing line, second ends of the resistor (R23) and the resistor (R24) are grounded, a first end of the fuse (F2) is connected to the null line of the external alternating current, a second end of the fuse (F2) is connected to the AC/DC switching circuit, the resistor (R23) and the resistor (R24) are physically contacted to the fuse (F2).

7. The constant temperature controlled circuit for an electric heating device of claim 1, further comprising a zero triggering circuit, wherein, the zero triggering circuit is connected to the fire line of the external alternating current and a zero signal input end of the central processing unit, which is used to detect a zero signal and output the zero signal to the central processing unit; wherein when the corresponding temperature of the sample voltage is lower than a selected temperature grade and the central processing unit receives the zero signal, the central processing unit outputs a control signal to the control end which switches on the TRIAC circuit.

8. The constant temperature controlled circuit for an electric heating device of claim 1, wherein, the AC detection circuit comprises a plurality of resistors (R1, R2, R3 and R4) and a diode (D1);
wherein a first end of the resistor (R1) is connected to a second end of the fuse (F1), a second end of the resistor (R1) is connected to an anode of the diode (D1) and a first end of the resistor (R2), a cathode of the diode (D1) is connected to a first end of the resistor (R3) and a first end of the resistor (R4), second ends of the resistor (R2) and the resistor (R3) are connected to the null line of the external alternating current, a second end of the resistor (R4) is connected to the central processing unit to output the detected result to the central processing unit.

* * * * *